(12) United States Patent
Lind et al.

(10) Patent No.: US 7,614,956 B2
(45) Date of Patent: Nov. 10, 2009

(54) ELECTRONIC LOTTERY SYSTEM WITH PROMOTION PRIZE DISTRIBUTION

(75) Inventors: Clifton E. Lind, Austin, TX (US); Jefferson C. Lind, Austin, TX (US)

(73) Assignee: Multimedia Games, Inc., Austin, TX (US)

(*) Notice: Subject to any disclaimer, the term of this patent is extended or adjusted under 35 U.S.C. 154(b) by 269 days.

(21) Appl. No.: 11/186,343

(22) Filed: Jul. 21, 2005

(65) Prior Publication Data
US 2007/0021164 A1 Jan. 25, 2007

(51) Int. Cl.
A63F 9/24 (2006.01)

(52) U.S. Cl. .................. 463/42; 463/16; 463/20; 463/22; 463/25; 463/43; 705/14

(58) Field of Classification Search ............. 463/16–18, 463/25–28, 20, 21–22, 42–43; 273/138.1, 273/269; 705/14
See application file for complete search history.

(56) References Cited

U.S. PATENT DOCUMENTS

| | | | |
|---|---|---|---|
| 5,002,313 A | 3/1991 | Salvatore | |
| 5,046,737 A | 9/1991 | Flenberg | |
| 5,324,035 A * | 6/1994 | Morris et al. | 463/42 |
| 5,365,575 A | 11/1994 | Katz | |
| 5,393,057 A | 2/1995 | Marnell, II | |
| 5,472,196 A | 12/1995 | Rusnak | |
| 5,613,679 A | 3/1997 | Casa et al. | |
| 5,628,684 A | 5/1997 | Bouedec | |
| 5,671,921 A | 9/1997 | Quinlan | |
| 5,772,511 A | 6/1998 | Smeltzer | |
| 5,871,398 A * | 2/1999 | Schneier et al. | 463/16 |
| 5,934,671 A | 8/1999 | Harrison | |
| 6,102,395 A | 8/2000 | Such | |
| 6,145,835 A | 11/2000 | Such | |
| 6,168,521 B1 * | 1/2001 | Luciano et al. | 463/18 |
| 6,210,276 B1 | 4/2001 | Mullins | |
| 6,319,125 B1 * | 11/2001 | Acres | 463/25 |
| 6,390,916 B1 | 5/2002 | Brown | |
| 6,402,614 B1 | 6/2002 | Schneier et al. | |
| 6,447,395 B1 | 9/2002 | Stevens | |
| 6,497,408 B1 | 12/2002 | Walker et al. | |
| 6,524,184 B1 | 2/2003 | Lind et al. | |
| 6,612,576 B1 | 9/2003 | Stancik et al. | |
| 6,616,531 B1 | 9/2003 | Mullins | |

(Continued)

FOREIGN PATENT DOCUMENTS

GB 2085308 A 4/1982

*Primary Examiner*—Dmitry Suhol
*Assistant Examiner*—Damon J. Pierce
(74) *Attorney, Agent, or Firm*—The Culbertson Group, P.C.; Nathan H. Calvert; Russell D. Culbertson

(57) ABSTRACT

A method includes communicating a distribution group of lottery game play records to a data storage device accessible to an assignment component included in a lottery gaming system. This assignment component may comprise a player station in the gaming system, a central computer system, or some intermediate component between the central computer system and player station. The method also includes communicating one or more promotion records to the data storage device accessible to the assignment component. The assignment component assigns game play records from the distribution group in response to lottery game play requests entered at a player station in the gaming system. However, in response to some lottery game play requests entered through the player stations, the assignment component assigns a promotion record in addition to, or in lieu of, a game play record. In these cases the player may be awarded a promotion prize associated with the assigned promotion record.

28 Claims, 5 Drawing Sheets

U.S. PATENT DOCUMENTS

| | | | |
|---|---|---|---|
| 6,698,755 | B2 | 3/2004 | Cherry |
| 6,733,385 | B1 | 5/2004 | Enzminger et al. |
| 6,773,345 | B2 | 8/2004 | Walker et al. |
| 6,786,824 | B2 | 9/2004 | Cannon |
| 6,824,135 | B2 | 11/2004 | Stancik |
| RE38,666 | E | 12/2004 | Orolin |
| 6,877,744 | B2 | 4/2005 | Such |
| 6,880,824 | B2 | 4/2005 | Thinnes |
| 7,416,484 | B1 * | 8/2008 | Nelson et al. ............... 463/25 |
| 2001/0036864 | A1 | 11/2001 | Melas |
| 2002/0165021 | A1 | 11/2002 | Several |
| 2003/0047869 | A1 | 3/2003 | Walker et al. |
| 2003/0190943 | A1 * | 10/2003 | Walker et al. ............... 463/17 |
| 2004/0173962 | A1 | 9/2004 | Cherry |
| 2004/0176158 | A1 | 9/2004 | Baldwin |
| 2004/0204222 | A1 | 10/2004 | Roberts |
| 2005/0049027 | A1 | 3/2005 | Weiss |
| 2005/0056995 | A1 | 3/2005 | Tempest et al. |
| 2005/0075158 | A1 | 4/2005 | Walker et al. |
| 2005/0096119 | A1 * | 5/2005 | Lind et al. .................. 463/19 |
| 2005/0124411 | A1 * | 6/2005 | Schneider et al. ............ 463/29 |
| 2005/0137016 | A1 * | 6/2005 | Enzminger et al. ........... 463/42 |
| 2006/0148559 | A1 * | 7/2006 | Jordan et al. ................ 463/29 |
| 2006/0205478 | A1 * | 9/2006 | Padgett ...................... 463/19 |
| 2006/0287051 | A1 * | 12/2006 | Katz et al. .................. 463/17 |

* cited by examiner

ELECTRONIC LOTTERY SYSTEM WITH PROMOTION PRIZE DISTRIBUTION

TECHNICAL FIELD OF THE INVENTION

This invention relates to lottery games. More particularly, the invention relates to a lottery gaming system which facilitates the use of special promotions to encourage lottery play. The invention includes gaming methods as well as gaming apparatus and program products for implementing the gaming methods.

BACKGROUND OF THE INVENTION

Lottery games have become popular in many jurisdictions in the United States and elsewhere. As used in this disclosure, a "lottery game" refers to a game played with a set (sometimes referred to as a game set) of predefined tickets or game play records that are each associated with a particular result in the game. Some of the predefined tickets or game play records are each associated with a respective winning result and thus represent winning tickets/game play records. Other predefined tickets or game play records in the game set are each associated with a respective losing result and thus represent losing tickets/game play records. Since the set of tickets or game play records making up a lottery game has a predefined number of tickets or game play records and predefined numbers of winning and losing tickets/records, the set has a predefined payout to players and predefined hold for the game operator. That is, assuming that all tickets or game play records in the game set are sold, both the cumulative payout to the players and the cumulative value in from ticket or game play record sales are known.

Traditional lottery games are played with a paper lottery ticket. These paper lottery tickets are commonly printed with graphics consistent with a theme of the game. The printed material for each respective ticket includes some result indicator that is correlated to, or indicates, the result associated with the respective ticket. These result indicators are commonly covered or obscured at the time the ticket is sold. Once the player obtains the ticket, he or she may remove the cover or obscuring material to reveal the result indicator and thus the result associated with the ticket.

The paper tickets in a traditional lottery game are commonly produced at some manufacturing facility in books of tickets, each made up of a continuous roll of individual tickets or a continuous fan fold stack of individual tickets with the individual tickets separated by perforations or break lines. Typically, a lottery game set will include a very large number of tickets, and the ticket books produced at the manufacturing facility each include only a fraction of the total tickets that make up a complete lottery game. The tickets are randomly ordered in the ticket books and are sold and distributed sequentially from the randomized book of tickets so that the results in the lottery game are distributed to players in a random order unknown to the players and ticket sellers.

Lottery games have been implemented in electronic form in which each ticket is represented by an electronic data structure rather than a physical paper ticket. An electronic data structure correlating to a respective result in a lottery game will be referred to further in this disclosure and accompanying claims as a "game play record" or alternatively as a "lottery game play record." The data structure representing a game play record may have any number of different forms. On one end of the spectrum, each game play record includes a result indicator, record identifier, and data that defines graphics that are used to display the result of the game play record to the player. At the other end of the spectrum, each game play record may include only a result indicator, and perhaps a record identifier, a table identifier, and a prize value. Regardless of the particular form of data structure used for the individual game play records, the game play records are commonly grouped in data files analogous to books of paper tickets and distributed in some random order from the file. Since the game play records are arranged in data files, the random distribution may be performed by randomizing the order of game play records in the respective data file and then distributing the game play records sequentially in that random order, or the game play records can be ordered in the data files and distributed randomly from the files.

Electronic lottery games may be implemented with a gaming system that includes a central processing system for storing different files that each contain some number of game play records and are analogous to books of physical lottery tickets. The central processing system distributes either individual game play records or game play record files to player stations which are in communication with the central processing system. In some cases, an intermediate component may receive game play record files from the central processing system and then communicate game play records to the player stations. The player stations include a display device for displaying information to the player, an arrangement for accepting wagers, an arrangement for receiving inputs from the player, and in some cases, an arrangement for storing game play record files containing some number of individual game play records. In this example electronic lottery system, a player enters the lottery game by making a lottery game play request at a player station. In response to the lottery game play request entered by the player, either the central processing system or an intermediate component (or the player station itself where the player station stores game play record files) assigns a particular game play record for the lottery game play request. Where the central processing system or intermediate component is responsible for assigning individual game play records for lottery game play requests, the central processing system or intermediate component also communicates to the player station either the assigned game play record or result information from the assigned game play record. Regardless of which system component is responsible for assigning the game play record for a given lottery game play request, the player station ultimately displays to the player the result associated with the game play record that was assigned for the player's lottery game play request.

Numerous features have been developed in electronic lottery gaming systems to attract new players and to maintain a players' interest during the course of play. For example, electronic lottery game operators have developed a wide variety of game themes and presentations offered at the player stations to present the lottery results in attractive and interesting formats. Some electronic lottery presentations imitate the play in traditional casino games while other presentations may use simulated competitions, such as horse races for example, to show lottery results. Some electronic lottery gaming systems offer progressive prizes, and thus attract players with the chance at the relatively larger prizes often possible in progressive gaming systems. However, it remains desirable to enhance an electronic lottery player's experience in participating in electronic lottery games.

SUMMARY OF THE INVENTION

The present invention provides a method for electronically implemented lottery games that allows special promotion prizes to be awarded in the course of lottery game play. These promotion prizes are distinct from any results included in the lottery games being played and may be varied over time and tailored to match the interests of players participating in the lottery games. In addition to gaming methods, the present invention also encompasses gaming systems and program products for implementing these gaming methods.

As used in the remainder of this disclosure and the accompanying claims a "lottery game" or simply "game" will refer to a set of game play records having a predefined frequency of results at each of a number of different result levels/tiers. A player participates in, that is, plays a lottery game by purchasing a game play record included in the set of such records making up the lottery game. For example, a lottery game may include a total of 50,000 game play records with each result being included in one of six result levels and with each result level associated with a particular prize. Continuing with this example, the lottery game may include 5 game play records at the sixth and highest result level, 95 game play records at the fifth result level, 900 game play records at the fourth result level, 4000 game play records at the third result level, 25,000 game play records at the second result level, and finally 20,000 game play records at the lowest result level. A player plays this lottery game by purchasing one of the 50,000 game play records.

A method according to the present invention may form one or more distribution groups of lottery game play records from a lottery game. For example, where a lottery game is made up of 50,000 game play records, a distribution group may include 5,000 game play records selected from the total set of 50,000. One or more of these distribution groups are communicated to a data storage device accessible to an assignment component included in the gaming system. This assignment component may comprise a player station in the gaming system, a central computer system, or some intermediate component between the central computer system and player station. The method also includes communicating one or more promotion records to the data storage device accessible to the assignment component. The assignment component assigns game play records from the distribution groups in response to lottery game play requests entered at player stations in the lottery gaming system. However, in response to some lottery game play requests entered through the player stations, the assignment component assigns a promotion record in addition to, or in lieu of, a game play record. In these cases the player may be awarded a promotion prize associated with the assigned promotion record.

In some preferred methods according to the invention, a promotion recall command may be produced at the end of a promotion period associated with a set of one or more promotion records. The promotion period may, for example, be a period of time in which the promotion prizes have been advertised as being available to participants in the lottery gaming system. In response to the promotion recall command, at least each promotion record remaining unassigned from the assignment component may be recalled from the data storage device associated with the assignment component. That is, the remaining unassigned promotion records may be transferred to another data storage device so that no further of the particular promotion records will be assigned to players in the lottery gaming system. Alternatively, recalling the promotion records may include simply invalidating the promotion records in some fashion so that they will not be assigned for further incoming lottery game play requests.

A gaming system according to the invention includes the assignment component and its associated data storage device. The data storage device associated with the assignment component stores a distribution group of lottery game play records and one or more promotion records. In preferred forms of the invention, the assignment component receives a lottery game play request and assigns a respective game play record for the lottery game play request. For some lottery game play requests, the assignment component also assigns a respective one of the promotion records for the lottery game play request either in lieu of a respective game play record or together with a respective game play record. Some forms of the invention employ a single assignment component to receive and respond to lottery game play requests from a number player stations, although some forms of the invention use a respective assignment component for each player station in the gaming system. Also, in some preferred forms of the invention, the assignment component includes a processing device that executes record store program code to direct the data storage device to store the distribution group and promotion records. The assignment of game play records and promotion records may be directed under the control of assignment program code executed by the assignment component.

Some forms of the invention also include a distribution component. This distribution component communicates the distribution group of lottery game play records to the data storage device associated with the assignment component. The same distribution component may also communicate the promotion records to the data storage device associated with the assignment component, although some forms of the invention may use separate components for communicating distribution groups and promotion records to the data storage device associated with the assignment component. In any event, the distribution component may include a processing device that operates under the control of distribution program code to communicate distribution groups and/or promotion records to the assignment component.

A promotion control component may be included in a gaming system according to the invention for producing the promotion recall command and communicating the promotion recall command to the assignment component. The promotion control component may include a processing device that executes promotion control program code to produce the recall command and communicate the command to the assignment component. The assignment component may respond to the promotion recall command by causing at least the unassigned promotion records to be transferred back to the distribution component. Alternatively, the assignment component may respond to the promotion recall command by invalidating the promotion records so that they may not be assigned in response to future lottery game play requests.

The present invention facilitates the distribution of special promotion prizes in connection with play in an electronic lottery gaming system. These promotion prizes may be awarded without interfering with or changing the basic structure of the underlying lottery games. Also, the arrangements for distributing promotion prizes according to the invention provide a great deal of flexibility to the lottery game operators. For example, the present invention allows promotions to be offered only for relatively short time periods and allows promotions to be tailored to the lottery game players' expected interests. These and other advantages and features of the invention will be apparent from the following description of the preferred embodiments considered along with the accompanying drawings.

DESCRIPTION OF PREFERRED EMBODIMENTS

The present invention will be described initially below with reference to an implementation using a particular arrangement of hardware and data structures. This implementation includes a hardware arrangement similar to that described in U.S. Pat. No. 6,733,385 issued May 11, 2004. The entire content of U.S. Pat. No. 6,733,385 is incorporated herein by this reference. However, it will be appreciated that the present invention is by no means limited to this particular arrangement of hardware, the methods implemented in the hardware, or the example data structures described below. Numerous variations on this implementation are possible within the scope of the present invention.

Figure 1:
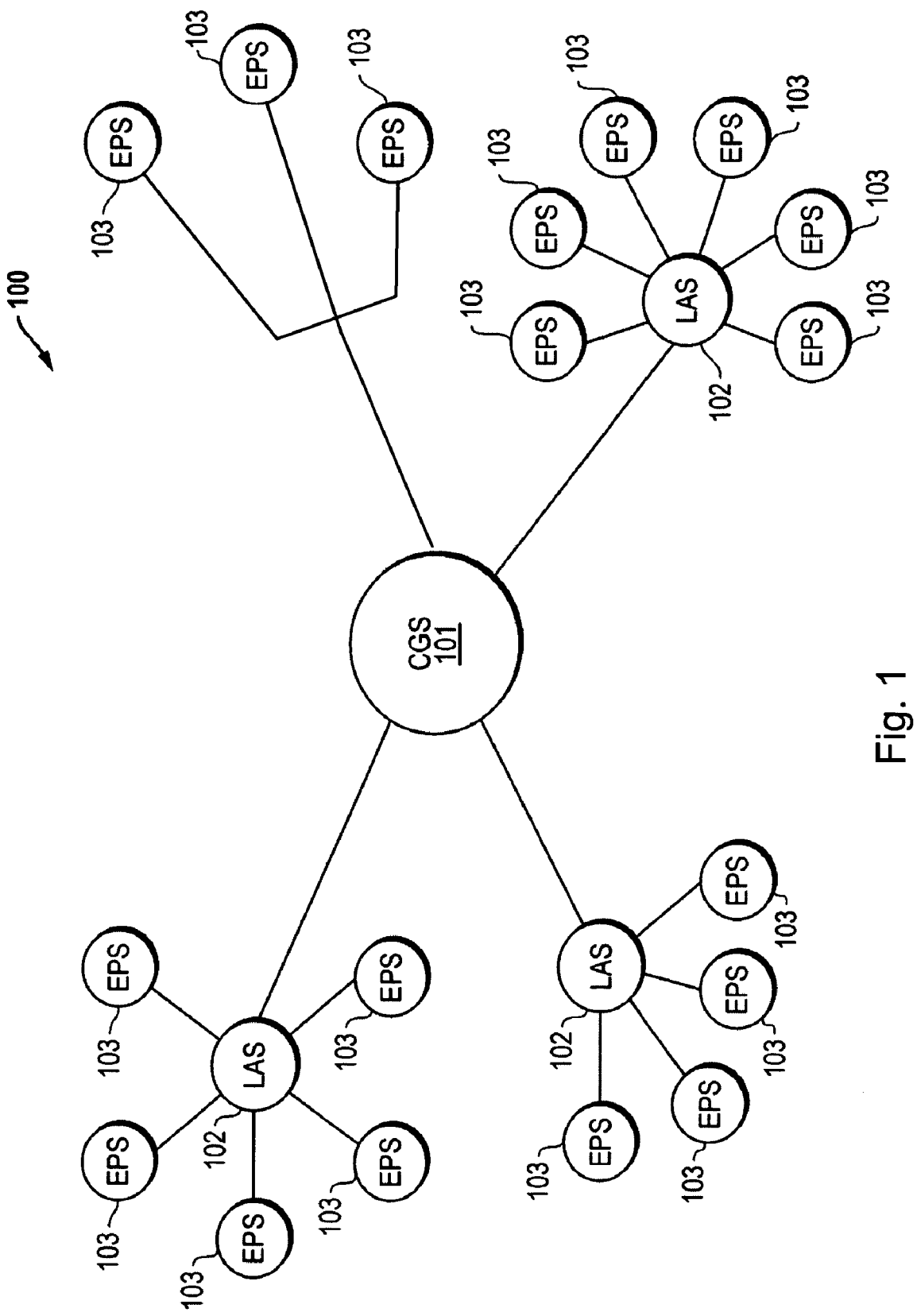
FIG. 1 is a high level diagrammatic representation of a gaming system embodying the principles of the present invention.

FIG. 1 shows a gaming system 100 including a central game server (CGS) 101 that cooperates with other components to enable players, preferably at many different remote gaming sites, to participate in lottery games. As will be discussed in further detail below, CGS 101 may include an component for creating lottery games and dividing the lottery games into distribution groups according to the invention. CGS 101 may also include a component for creating promotion records for use in distributing promotion prizes according to the invention. A game play record distribution component may also be implemented at CGS 101 for distributing the distribution groups and promotion records to a game play record assignment component responsible for assigning game play records and promotion records to players participating in the lottery games. CGS 101 may further implement a promotion control component for producing a promotion recall command that is used in the gaming system to prevent further promotion records from being distributed.

Players participate in lottery games offered through system 100 by entering game play requests at any one of a number of player stations (EPSs) 103 included in the system. Some gaming sites in the illustrated system include a local area server (LAS) 102 and a number of player stations 103. However, some gaming sites include simply one or more player stations 103 which communicate directly with CGS 101. The gaming sites may comprise dedicated gaming facilities (casinos) or retail establishments such as convenience stores, or both.

A lottery result for a lottery game play request is presented to the player at a player station 103. Each lottery result corresponds relates to a result defined by a respective game play record that is assigned for the lottery game play request. The game play record defining the result may either be selected at the player station 103 itself, or by a system component separate from the respective player station 103 from which the game play request was initiated. In one preferred embodiment, a player station 103 implements the game play record assignment component which selects a respective game play record from a distribution group for that respective player station. In this case, one or more distribution groups of lottery tickets may be stored at the respective player station 103. In other preferred embodiments, the game play record assignment component is implemented through an intermediate component such as an LAS 102 which may store one or more distribution groups from which game play records may be assigned in response to lottery game play requests originating from one or more player stations 103 serviced by the respective LAS. In still other embodiments, an assignment component may be implemented at CGS 101 in lieu of or in addition to an assignment component implemented at an LAS 102.

CGS 101 and each LAS 102 included in system 100, as shown in FIG. 1, may comprise one or more computer systems each having one or more processors, nonvolatile memory, volatile memory, a user interface arrangement for a system operator, and a communications interface, all connected to a system bus. Although additional processing component details are shown and discussed in connection with FIG. 3, much of these computer system components are omitted from the present drawings and discussion so as not to obscure the present invention in unnecessary detail. Where CGS 101 and LASs 102 include general purpose computer systems, memory accessible by the respective computer system will store operation program code which may be executed by the respective computer processor to direct the various functions performed by the respective system.

It will be appreciated that the particular configuration of devices shown in FIG. 1 is shown only for purposes of example. A gaming system according to the present invention may omit some or all of the separate LAS's 102 at the various gaming facilities so that the player stations 103 communicate directly with CGS 101 as shown at the upper right of FIG. 1. Alternatively, a gaming system according to the invention may instead include a respective LAS 102 interposed between the CGS 101 and each group of player stations 103 included in the system. Also, various regions or different gaming facilities may be divided up into separate systems each having a respective CGS such as CGS 101. A system according to the invention may also be configured such that any one of several different CGSs could service a given player station 103 anywhere in the system.

Figure 2:
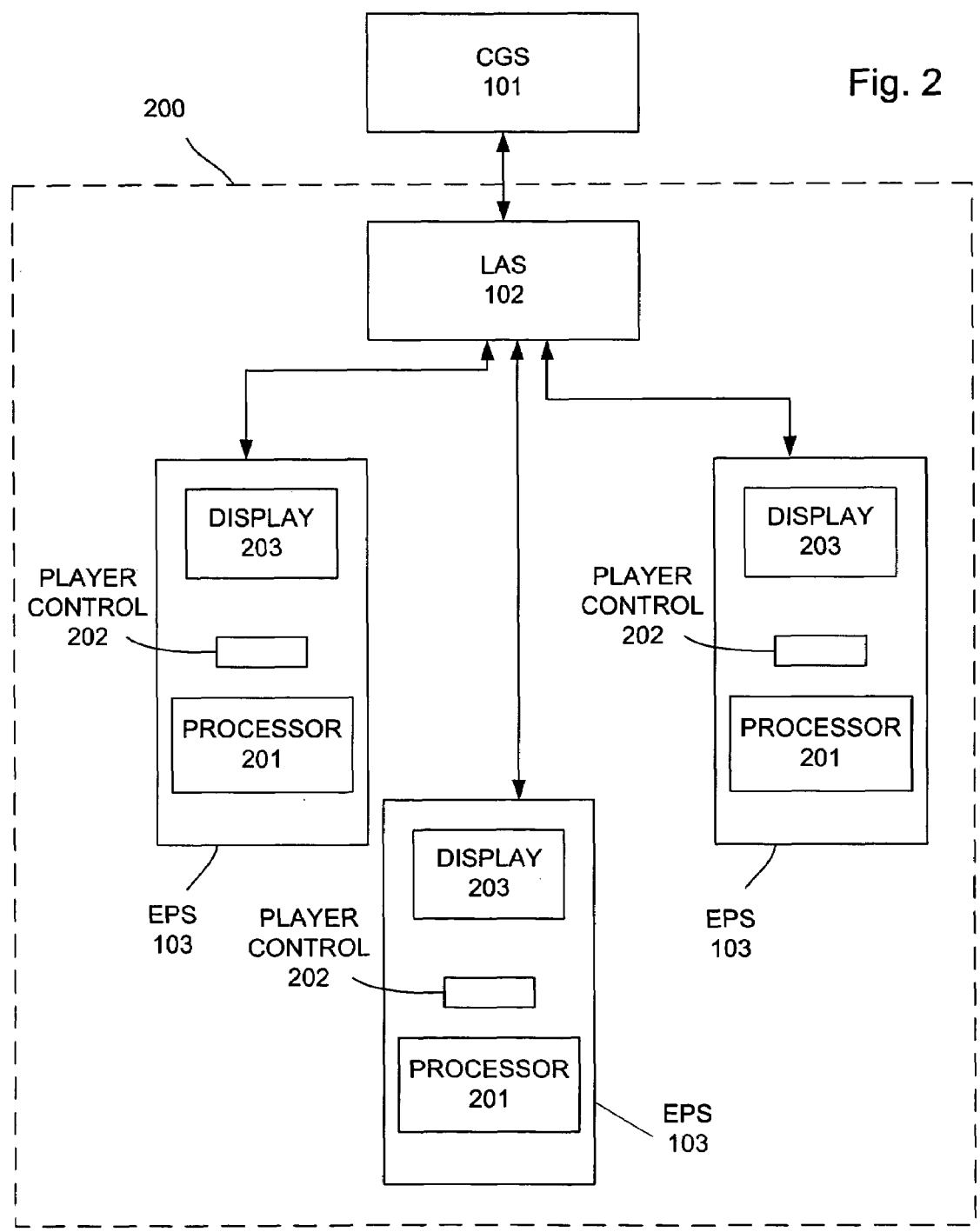
FIG. 2 is a diagrammatic representation of a portion of the system shown in FIG. 1.

FIG. 2 shows an individual gaming site 200 of the complete system 100 shown in FIG. 1. The illustrated gaming site 200 includes a single LAS 102 with several player stations 103 operatively connected for communication with the LAS. Player stations 103 shown in FIG. 2 are each illustrated as having a processor 201 and a user interface arrangement including a player control arrangement 202 and display 203. Although not shown separately in the drawing, processor 201 may be associated with volatile and nonvolatile memory and a communications interface. The processor 201 in a respective player station 103 may access program code that may be executed by the processor to cause the processor to perform or direct the various functions provided by the respective player station. In particular, processor 201 will receive various player inputs from the player control arrangement 202 associated with the respective player station 103. Processor 201 also directs the respective display 203 to generate or produce graphics consistent with a game play record and/or a promotion record that has been assigned for a given lottery game play request. It will be noted that processor 201 may direct display device 203 either directly or through a separate graphics processor (not shown). Also, it should be noted that in some implementations of a player station 103, the inputs for a player such as an input to make a game play request and/or a wager input may be entered by someone other than the player of the lottery game, for example, by an attendant at a convenience store in which a player station 103 is located.

A player control arrangement 202 associated with a respective player station 103 may include any type of input arrangement. For example, player control arrangement 202 may include one or more push buttons, keys, or lever activated switches, for example. Also, the player control arrangement 202 may include a touch screen and thus be integrated with display 203. It will also be appreciated that a player station 103 that may be used in the present invention may include more than a single display. Thus, display 203 includes at least one video monitor/display such as a CRT, LCD, plasma, or other display device for displaying graphics in the course of game play.

FIG. 2 provides only a very diagrammatic representation of each player station 103 and does not show many elements that may be included in a player station 103. Further, the player stations 103 need not be identical throughout the system 100. Rather, there may be wide variations in the various components included in each player station 103. The system shown in FIG. 2 is limited generally to show just the elements necessary or helpful in describing the present invention. Further elements that may be included in an actual player station are not shown so as not to obscure the present invention in unnecessary detail.

Examples of additional components that may be included with a player station 103 include a separate graphics processor for driving display 203, a sound system for providing high quality audio output at the player station 103, and a visual alerting device such as a light mounted at the top of the player station. Display 203 may also include or comprise a mechanical display arrangement such as an arrangement of one or more spinning wheels or a set of slot machine-style spinning reels. Also, those familiar with gaming machines will appreciate that each player station may include a device or arrangement of devices for accepting currency, tokens, and/or vouchers, and a device or arrangement of devices for dispensing currency, tokens, and/or vouchers as winnings. Value may be received through a currency or voucher reader and/or through a token or coin acceptor. Payouts may be made using a coin, currency, or token dispensing arrangement included in player station 103. Alternatively, or in addition to a coin or token dispensing arrangement, player station 103 may include a printer (not shown) for printing a ticket or voucher showing the player's winnings or account value. The player may redeem this ticket through a game operator, for example, or the player may use the ticket in another gaming terminal. This ticket printing arrangement may be particularly useful in the present invention in which physical promotion prizes such as clothing, event tickets, and other items maybe awarded to players. That is, a ticket or voucher printed at the player station may be redeemable for a physical promotion prize awarded to the player according to the present invention. In yet other arrangements, wagers and winnings, including promotion prizes, may be tracked through a suitable player account arrangement included in gaming system 100, and a player may redeem their account through a system cashier or through some other suitable account interface arrangement. Of course, any appropriate devices for receiving and issuing value in games played according to the present invention may be used, and the devices may even be completely separate from the player station 103.

Figure 3:
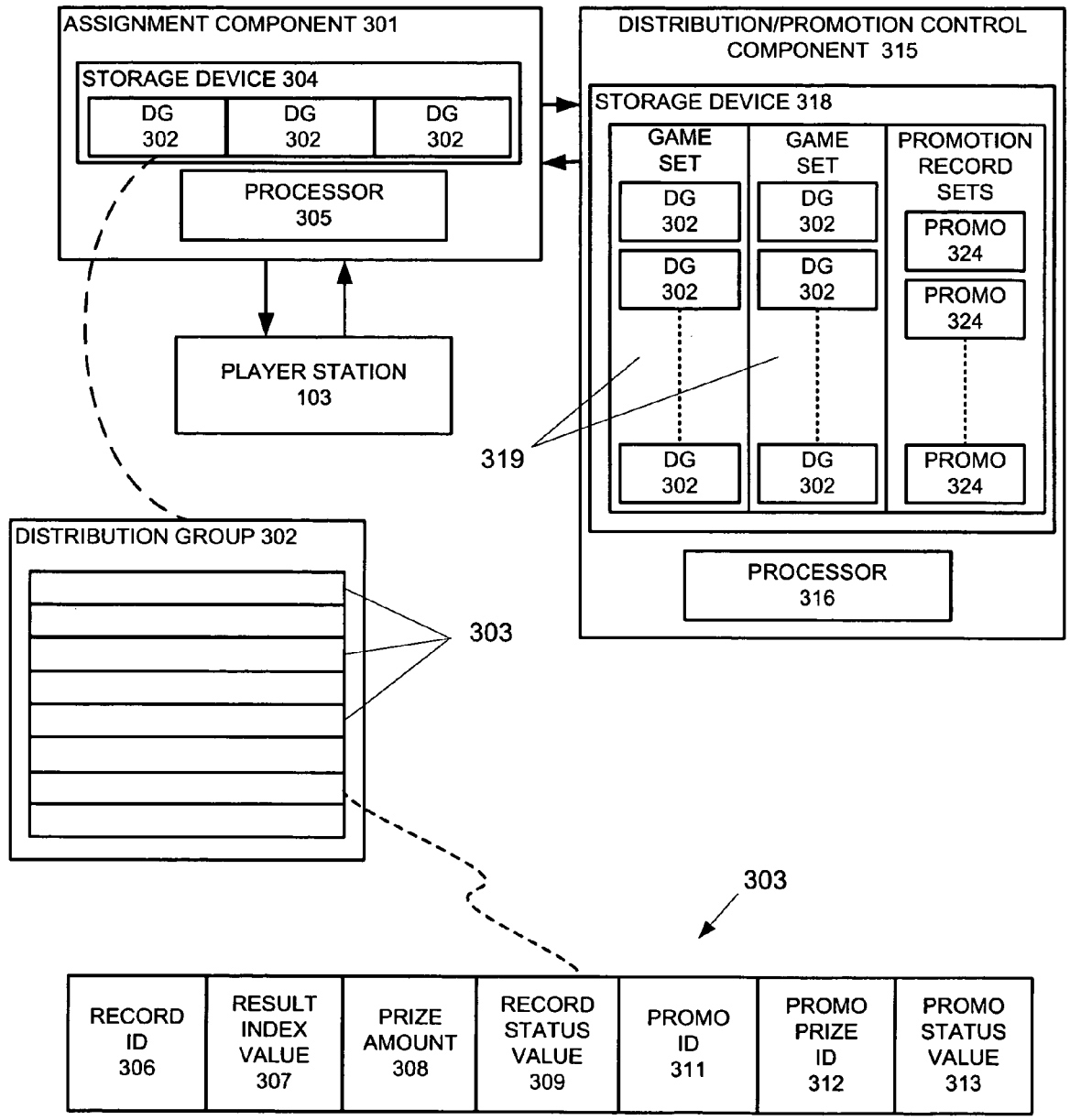
FIG. 3 is a diagram showing a distribution group structure and game play record structure together with the relationship between processing components in one preferred embodiment of the invention.

FIG. 3 comprises a functional block diagram showing the interaction between a player station 103 as described above and the assignment component 301 of a gaming system embodying the principles of the invention. FIG. 3 may also be used to describe the interaction between a distribution/promotion control component 315 and assignment component 301.

Assignment component 301 includes an arrangement of elements for assigning game play records 303 from distribution groups 302. In particular, assignment component 301 includes a storage device 304 for storing preferably a number of distribution groups 302, where each distribution group includes a number of game play records 303. Assignment component 301 also includes a processing device 305. As discussed above in connection with system 100 shown particularly in FIG. 1, assignment component 301 could be implemented through CGS 101, an LAS 102, a player station 103, or some combination of these components in system 100.

A distribution group 302 according to the invention may be embodied in any suitable data structure. FIG. 3 shows a representation of a single data file as the distribution group 302, containing a number of individual game play records 303. Each game play record 303 includes a record identifier 306, a result index value 307, a prize amount 308, and a record status value 309. These values in game play record 303 are set when game play records 303 are first formed for the respective lottery game. Record identifier 306 comprises a suitable identifier by which the respective game play record 303 may be distinguished from any other game play record for a give lottery game, or from any other game play record for any lottery game available in the gaming system. Result index value 307 comprises an index value that defines the result associated with the game play record. Regardless of the manner in which the result associated with the respective game play record 303 is defined in the record, the prize amount 308 may be included in the respective record to provide a direct indication of the prize value associated with the respective game play record.

Record status value 309 shown in FIG. 3 is used to indicate whether the particular game play record is available for assignment for a game play request. All game play records 303 are initially given a record status value 309 indicating that the record is unassigned and available for assignment for a lottery game play request. This status can be indicated by a single bit of data and indicates that the game play record is unused, that is, that the game play record has not yet been assigned for a lottery game play request. When a respective game play record 303 is assigned for a game play request, processor 305 associated with assignment component 301 causes the record status value 309 of the assigned game play record 303 to be updated to an assigned/used status. With the record status value 309 of the game play record 303 set to this assigned/used status, the respective game play record will not be available for assignment for an incoming lottery game play request.

It will be appreciated that numerous other arrangements may be used to indicate which game play records 303 in a distribution group 302 have been assigned for a game play request and which have not been so assigned. For example, one alternative arrangement maintains the assigned/unassigned status information for game play records of a distribution group in a separate data table. Also, game play records may be removed from a given distribution group as they are assigned so that the mere presence in a given data structure indicates that the game play record is unassigned. The invention encompasses any arrangement for distinguishing between assigned and unassigned game play records.

The structure shown in FIG. 3 for game play records 303 is shown only as a convenient example of a suitable game play record data structure. The invention is by no means limited to this data structure or any other particular data structure for game play records. Other elements that may be included in a game play record that may be used in the present invention include a sequence value for indicating the order of the respective game play record in the distribution group. Also, as indicated in incorporated U.S. Pat. No. 6,733,385, an index table identifier may be used in addition to result index value 307 to allow a player station to identify an appropriate graphic for showing the result associated with the game play record. Other types of game play record data structures may include additional fields for data that is used in generating graphics to show the respective result. The game play record data structure shown in FIG. 3, however, represents a preferred form because it requires minimum data. Where this type of data structure is used for a game play record, the player station 103 may use the element or elements which define the result associated with the game play record and perhaps an index table identifier to identify a graphic display to be produced at the player station to show the player the particular result. This type of graphics control at the player station is described further in incorporated U.S. Pat. No. 6,733,385. However, it should be noted that numerous data structures may be employed for defining game play records to be assigned to players in a lottery gaming system and that the invention is not limited to any particular form or structure for distribution groups 302 or game play records 303.

The example game play record 303 shown in FIG. 3 incorporates a promotion record according to the present invention. In particular, the last three fields on the right of game play record 303 comprise fields that define a promotion record. A promotion ID 311 comprises a value that identifies the particular promotion record. A promotion prize ID 312 comprises an indicator for the particular promotion prize associated with the promotion record. A promotion status value 313 comprises a value that indicates whether or not the particular promotion record is available for assignment for a lottery game play request. As with record status value 309, promotion status value 313 may comprise a single bit that is toggled to one state to indicate that the promotion record is available to be assigned or to the opposite state to indicate that the promotion record is not available for assignment. Promotion records and their use according to the invention will be described further below with reference to the flow chart of FIG. 6, as will variations on the manner in which promotion records may be associated with a distribution group of game play records.

It will be appreciated that game play records 303 are preferably assigned randomly to satisfy game play requests. This randomization may be accomplished in any suitable fashion. One method for ensuring game play records 303 are assigned randomly is to randomize the order of game play records in the distribution group 302 and then assign game play records sequentially from the randomized set of game play records making up the distribution group. Another method for ensuring game play records are assigned in random order is to randomly assign game play records from an ordered distribution group of game play records.

Rather than separate distribution and promotion control components, FIG. 3 shows a single distribution/promotion control component 315. The illustrated distribution/promotion control component 315 includes a processor 316 and a storage device 318 for storing game sets 319 of game play records. Each game set 319 makes up a respective lottery game and is divided into numerous distribution groups 302. Storage device 318 also stores promotion records according to the invention. These promotion records are shown as a number of different promotion record sets collected in files or other data structures 324, which are labeled with the designation "PROMO" in FIG. 3. Processor 316 controls the operation of storage device 318 and directs or controls the various operations performed by distribution/promotion control component 315. In a preferred implementation of the invention, distribution/promotion control component 315 creates or receives lottery games divided into distribution groups 302 of game play records, creates or receives promotion record sets 324, and communicates both the distribution groups and promotion record sets 324 to assignment component 301 and other similar assignment components which are omitted from FIG. 3 in order to simplify the drawing. The promotion control part of distribution/promotion control component 315 also preferably produces promotion recall commands as required and communicates these promotion recall commands to assignment component 301. These operations, and particularly the creation of promotion record sets and use of promotion recall commands will be described in further detail below with reference to the flow chart of FIG. 6.

It should be noted that although the ability to recall promotion records through an arrangement such as a promotion control component represents a significant advantage of some forms of the present invention, systems according to the invention do not require the ability to recall promotion records. Some forms of the invention may not have the capability of recalling promotion records and may not include a promotion control component either implemented by itself or with another component such as in component 315 in FIG. 3.

Those skilled in the art will appreciate that the invention may be embodied in many arrangements other than the illustrative arrangements shown in FIGS. 1, 2, and 3. For example, a single computer system may generate lottery games and, along with storing promotion records for assignment, may also store game play records from these lottery games for assignment to lottery game play requests received from several player terminals such as player stations 103. Thus, a single computer system may implement a distribution component and assignment component. Distribution groups of game play records and promotion records may also be stored at a respective player station for use in satisfying game play requests according to the invention. In this case, the player station 103 implements its own assignment component. In yet other arrangements within the scope of the present invention, a single computer system could perform the lottery game generation function, implement a distribution component, implement an assignment component which assigns game play records, and provides a player input and display, thus replacing the separate systems 101, 102, and 103 shown in FIGS. 1 and 2 and separate systems 103, 301, and 315 shown in FIG. 3. These alternative arrangements are to be considered equivalent to the arrangement shown in FIGS. 1, 2, and 3. In particular, it should be noted that although it is conceptually convenient to describe components in the present gaming system by their respective function (assignment component, distribution component, promotion control component), this description should not be taken to imply that these components are separate and discrete devices. Rather, as indicated for example in FIG. 3 with respect to component 315, the components of a gaming system according to the present invention may be combined so as to be implemented by a common processing device. Furthermore, there may be wide variation within the scope of the present invention in the specific components included even in the basic arrangement of systems shown in FIG. 1. For example, LAS 102 may in fact be made up of several different processing systems rather than a single computer. In one preferred form of the invention, LAS 102 includes a separate processing device programmed to receive and respond to lottery game play requests and a separate processing device programmed to implement databases for supporting the operation of the processing device which implements an assignment component for servicing lottery game play requests, for example, a database to hold distribution groups from which game play records are assigned and to hold reserve distribution groups that are not currently being used to satisfy game play requests, but are readily available should additional game play records be required.

Figure 4:
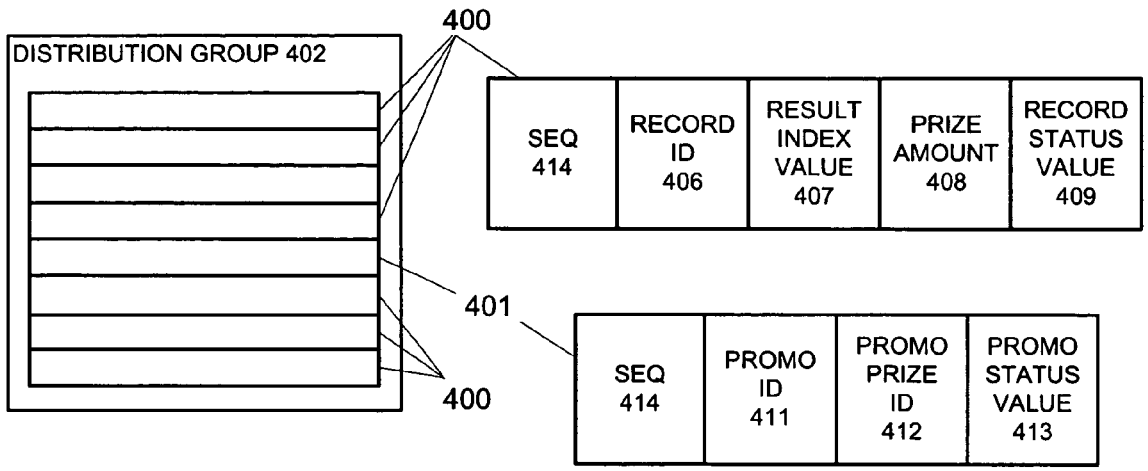
FIG. 4 is a diagrammatic representation of an alternate arrangement for storing a distribution group and promotion records at an assignment component according to the invention.

FIG. 4 shows an alternate arrangement for storing a distribution group of lottery game play records and promotion records to be assigned according to the present invention. In this arrangement, separate game play records 400 are stored together with separate promotion records 401 in a combined distribution group 402. In this example arrangement, each game play record 400 includes a record ID (identifier) value 406, result index value 407, prize amount 408, and record status value 409, corresponding to the values 306, 307, 308, and 309 in game play record 303 shown in FIG. 3. Each promotion record 401 in the example shown in FIG. 4 includes a promotion ID (identifier) value 411 and a promotion prize ID (identifier) 412. These values correspond to the values 311 and 312, described above with reference to FIG. 3. Additionally, each game play record 400 and each promotion record 401 further includes a sequence value 414 (SEQ 414 in FIG. 4) indicating the order of the respective game play record or promotion record relative to the other game play records and promotion records in combined distribution group 402. Further details on the manner in which combined distribution group 402 may be created and used to distribute game play records and promotion records according to the invention will be described below with reference to FIG. 6. However, it will be noted here that a combined distribution group such as group 402 in FIG. 4 may be produced at the distribution/promotion control component 315 in the example arrangement shown in FIG. 3, or at the assignment component 301. In any event, the combined distribution group 402 would be stored at the storage device 304 associated with assignment component 301 in lieu of distribution groups 302 shown in FIG. 3.

Figure 5:
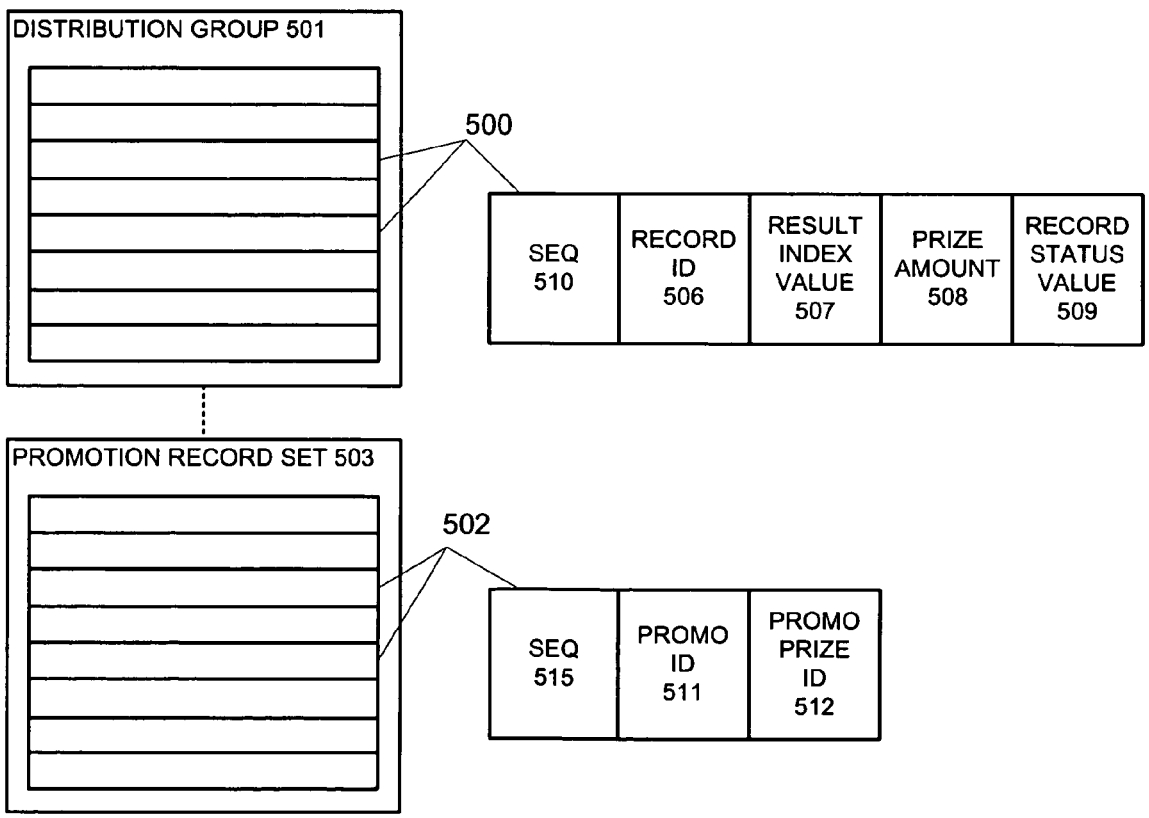
FIG. 5 is a diagrammatic representation of another alternate arrangement for storing a distribution group and promotion records at an assignment component within the scope of the present invention.

FIG. 5 shows another alternative arrangement for storing lottery game play records and promotion game play records to be assigned according to the present invention. In this arrangement, game play records 500 are stored in a first file 501 to form a distribution group and promotion records 502 are stored in a separate file 503 to form a promotion record set. Each game play record 500 includes a record ID value 506, a result index value 507, a prize amount value 508, and a record status value 509 corresponding to the values 306, 307, 308, and 309 in FIG. 3. Additionally, each game play record 500 includes a sequence value 510 (SEQ 510 in FIG. 5), which comprises a value indicating the order of the respective game play record in file 501. Each promotion record 502 in promotion record file 503 includes a promotion ID value 511 and promotion prize ID value 512, which correspond to values 311 and 312 respectively in the game play records 303 shown in FIG. 3. Additionally, each promotion record 502 includes a sequence value 515 (SEQ 515 in FIG. 5), which comprises a value indicating the order of the respective promotion record in promotion record file 503. Further details on the manner in which separate files 501 and 503 may be used to distribute game play records and promotion records according to the invention will be described below with reference to FIG. 6. however, it will be noted here that the arrangement of files 501 and 503 in FIG. 5 may be produced at distribution/promotion control component 315 in the example arrangement shown in FIG. 3, or at assignment component 301. In any event, the arrangement of files 501 and 503 would be stored at storage device 304 in FIG. 3 in lieu of a distribution group 302.

Figure 6:
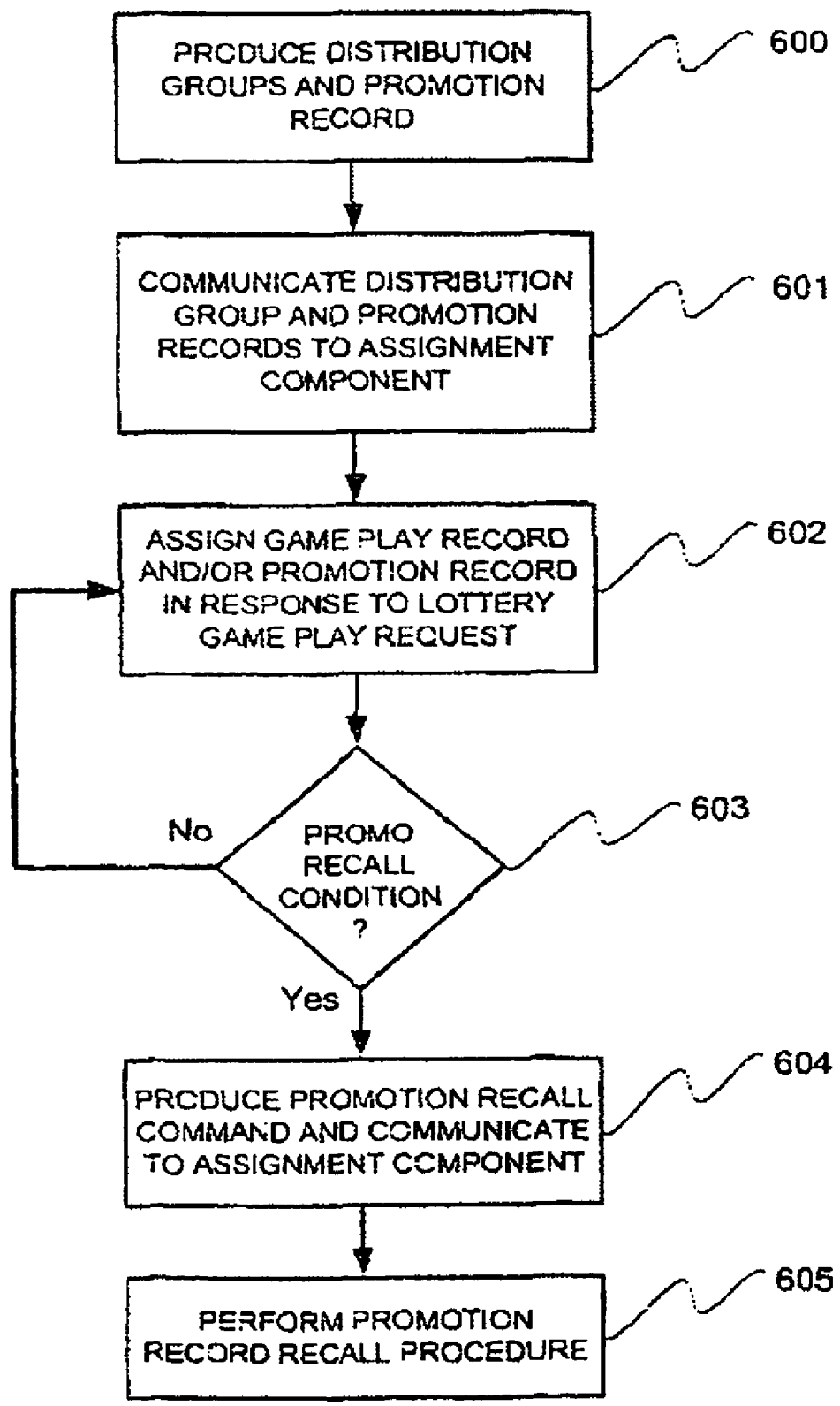
FIG. 6 is a flow diagram illustrating a gaming method embodying principles of the present invention.

The flowchart shown in FIG. 6 may be used to describe preferred methods according to the present invention. As shown at process block 600 in FIG. 6, a method according to the invention may include producing both distribution groups of lottery game play records and promotion records. As indicated at process block 601 these promotion records and distribution groups are communicated to an assignment component such as component 301 in FIG. 3 which is responsible for assigning the game play records and/or promotion records for game play requests. Game play records and promotion records are then assigned from the assignment component as shown at process block 602 in response to a game play request. Game play records and promotion records may be assigned in the step indicated at block 602 in response to respective game play requests until a promotion recall condition occurs. Upon the occurrence of this promotion recall condition as determined at decision block 603 in FIG. 6, a promotion recall command is produced and communicated to the assignment component as shown at process block 604. A promotion record recall procedure (also referred to as a "recall procedure") is then performed as indicated at block 605 so that no further promotion records are assigned in response to incoming lottery game play requests.

The step of producing distribution groups and promotion records as indicated at process block 600 in FIG. 6 may be performed in any suitable fashion. With regard to distribution groups for example, a game set of lottery game play records may be generated in a suitable fashion and then divided into subsets which are used as distribution groups. However, a distribution group according to the invention may include an entire lottery game set and not merely a subset of such a game set. It should also be noted that a distribution group may be made up of game play records that are left unassigned from two or more other distribution groups from which other game play records have already been assigned.

Promotion records may be produced in sets of such records in view of some promotion goal to appeal to some target group of potential lottery players. Depending upon the nature of the promotion, a promotion record set according to the invention may include as few as a single promotion record or a large number of promotion records. A promotion record set may be designed to provide a very few number of large promotion prizes, or may be designed to provide a relatively large number of small promotion prizes. Still other promotion record sets may employ a combination approach with a small number of relatively large promotion prizes and a much larger number of relatively smaller promotion prizes. In some forms of the invention, a promotion record set includes only records that are associated with some promotion prize. These types of promotion record sets will include no losing promotion records. Other forms of the invention may produce promotion record sets similar to lottery game sets in that some of the records may be associated with a promotion prize and others may be associated with no prize.

A wide variety of promotion prizes may be associated with promotion records according to the invention. A promotion prize may be gaming credit, or tangible items such as currency, clothing (baseball caps and T-shirts for example), sporting or other event tickets, or entries in a sweepstakes game, for example. Substantially any type of promotion prize may be associated with a promotion record. As discussed further below with regard to process block 602, a gaming system implementing the invention may include an arrangement for issuing vouchers or tickets at the player stations and these vouchers or tickets may be redeemed for a promotion prize comprising a physical item.

It should be noted that the promotion records are created entirely independently of a lottery game and that the promotional records are distinct from lottery game play results. That is, rather than being associated with a chance in a lottery game, a promotional record may simply be associated with a promotion prize to be awarded to a player in a lottery game. The promotion prizes available in promotion records do not correspond to any prize level in a lottery game definition although it is possible for a given promotion prize to be equal to a prize in a lottery game.

Some forms of the invention may rely upon a third party to produce distribution groups and promotion records. In these forms of the invention, rather than producing the distribution groups and promotion records as indicated at process block 600 in FIG. 6, the invention includes receiving the distribution groups and promotion records from the third party producer. The distribution groups and promotion records may be received in any suitable fashion. For example, the data may be read from a suitable medium at a component such as the distribution/promotion control component 315 in FIG. 3. Alternatively, the data defining the distribution groups and promotion records may be communicated from the third party over a suitable data transfer connection such as a wired or wireless network connection.

The step or steps associated with communicating distribution groups and promotion record sets to the assignment component as indicated that process block 601 in FIG. 6 will depend upon a number of factors, including the manner in which promotion records are assigned for lottery game play requests and how promotion records and game play records are stored at the assignment component. In any event, preferred forms of the invention perform the communication step or steps under the control of distribution program code executed at a suitable processing device such as a distribution component described above with reference to FIG. 3.

In some preferred forms of the invention, promotion records are incorporated in some fashion into the distribution groups of lottery game play records. The combined game play record and promotion record shown at 303 in FIG. 3 provides one example of the incorporation of a promotion record into a distribution group. Distribution group 402 shown in FIG. 4 provides another example of the incorporation of a promotion record into a distribution group. In the example shown in FIG. 4, however, promotion records are not incorporated into individual game play records but are included in the distribution group as separate data records commingle with the lottery game play records. In either of the cases, either the combining of promotion records into game play records shown in FIG. 3 or the commingling of separate promotion records and game play records as shown in FIG. 4, the step of incorporating the promotion records into the distribution group may be performed at some central component such as distribution/promotion control component 315 shown FIG. 3. The promotion records and distribution group may then be concurrently communicated to the assignment component in the resulting combined data structure.

Other forms of the invention may incorporate the promotion records and distribution groups at the assignment component or may not incorporate the promotion records with a distribution group at all. The arrangement of separate files 501 and 503 shown in FIG. 5 provides an example of a situation in which promotion records are not incorporated into a distribution group. Where the promotion record/distribution group incorporation is performed at the assignment component such as component 301 in FIG. 3, or where the promotion records are not incorporated with a distribution group as exemplified by separate files 501 and 503 in FIG. 5, the step of communicating the distribution group and promotion records indicated at process block 601 in FIG. 6 includes communicating the distribution group and promotion records separately to the assignment component.

The nature of the communications required to perform the steps indicated at process block 601 in FIG. 6 will depend in large part upon the nature of the gaming system in which the invention is implemented. In the arrangement shown in FIG. 3, both the distribution groups and promotion records may be communicated to the assignment component 301 over a network connection. The invention is not limited to any particular type of communication arrangement to facilitate communications between the distribution component such as component 315 in FIG. 3 and assignment component 301 in that figure. The communication may be through any wired or wireless communication arrangement using any suitable communication protocol. It should also be noted that since the communication of distribution groups and promotion records from the distribution component to a given assignment component may need to be performed only infrequently, a continuous communication arrangement between the distribution component and assignment component may not be necessary. In particular, a communication connection between the distribution component and a given assignment component may be established only periodically in order to communicate a distribution group and promotion records as indicated at process block 601 in FIG. 6. Also, In forms of the invention in which the distribution component and assignment component are implemented in a single processing system, the communication indicated at process block 601 in FIG. 6 may comprise simply identifying the data storage locations for the distribution group and promotion records. The processes executed at the processing system to implement the assignment component may then access the distribution group and promotion records through the identified data storage locations.

Regardless of the step or steps required to communicate a distribution group and promotion records to the assignment component, some preferred forms of the invention include record store program code that is executable for causing the distribution group and promotion records to be stored at data storage system (a single storage device or multiple storage devices) from which lottery game play records are assigned in a lottery gaming system. This record store program code may be executed by a component such as assignment component 301 in FIG. 3. Alternatively, a separate component may execute the record store program code to appropriately store the distribution group and promotion records.

The manner in which promotion records and game play records are assigned as indicated a process block 602 in FIG. 6 is dependent on a number of factors including particularly how the promotion records and distribution groups are stored at the data storage device for the assignment component. When promotion records are incorporated with the distribution group, the assignment component such as component 301 in FIG. 3 may respond to the incoming lottery game play request by randomly selecting next game play record 303 from the distribution group. Since the promotion records are incorporated into the game play records themselves, both the game play record and promotion record are assigned at the same time. In contrast, where promotion records are simply incorporated as separate records into the distribution group of game play records as in the example of FIG. 4, the assignment component may assign either a game play record, or a promotion record depending upon the next record selected from distribution group 402 in the random assignment arrangement implemented by the assignment component. It will be appreciated that in the case of the arrangement shown in FIG. 4, the gaming system will require some mechanism for handling the wager that was associated with the player's lottery game play request for which a promotion record is assigned. In some forms of the invention, where the promotion record is assigned instead of a game play record, the wager associated with the lottery game play request is simply ignored or returned to the player. Alternatively, to avoid having to ignore or return the wager associated with a lottery game play request, the invention may include automatically assigning a game play record for the lottery game play request in addition to the promotion record. This automatic assignment of a game play record may include simply assigning the next selected record in distribution group 402 in FIG. 4. In this case, the wager is used for the assigned game play record and is not ignored or returned to the player. It will also be appreciated that even in the arrangement shown in FIG. 4, each promotion record 401 may be pre-associated with a respective one of the game play records 400 included in the distribution group 402. For example, the promotion record 401 may be associated with an adjacent game play record 400 in distribution group 402 so that the assignment of a promotion record effectively assigns the associated game play record.

In forms of the invention in which the promotion records are not incorporated into a distribution group in some fashion, the assignment step shown at block 602 in FIG. 6 may include separate assignment steps for game play records and promotion records. In one preferred form of the invention, the promotion record assignment procedure includes determining when a promotion record is to be assigned in response to a lottery game play request. This determination may be made in any number of fashions within the scope of the invention. One preferred procedure includes generating a random number in some overall range and then determining if the generated random number is within some smaller predetermined range within this overall range. If the random number is within the smaller predetermined range, a promotion record will be assigned for the lottery game play request, otherwise no promotion record will be assigned.

Rather than using a separate promotion record selection process to determine whether a promotion record is to be assigned to a give lottery game play request, some forms of the present invention assign a promotion record for every lottery game play request. In these forms of the invention, the promotion record set such as set 503 in FIG. 5 may be designed similarly to a lottery game set or distribution group with some promotion records associated with a promotion prize and others not associated with a promotion prize. At the time a respective promotion record is assigned, information included in the assigned promotion record such as the promotion prize ID 512 in FIG. 5 may be read to identify whether there is a promotion prize associated with the assigned promotion record, and thus whether a promotion prize is to be awarded to the lottery game player initiating the lottery game play request.

In yet other forms of the invention using a separate promotion record set such as set 503 in FIG. 5, the assignment of promotion records may be accomplished through an association between promotion records and game play records in the distribution group. In this form of the invention, one or more of the game play records in a distribution group such as distribution group 501 in FIG. 5 may be associated either specifically or generally with a promotion record in a promotion record set such as set 503. For example, a game play record in the example of FIG. 5 may be associated with a specific promotion record by the sequence value 510 or record ID value 506 of the game play record 500 and by the sequence value 515 of the promotion record. In this case, when the respective game play record 500 is assigned for a lottery game play request, the associated promotion record 502 will also be assigned for that lottery game play request. This arrangement may employ a separate data structure for correlating a respective game play record 500 with a respective promotion record 502. Alternatively to a specific association to a promotion record 502, various game play records 500 may be generally associated with a promotion record. For example, game play records 500 in FIG. 5 may be randomly selected to be associated with a promotion record from set 503. The identity of these game play records may be stored in a separate data structure by sequence value 510 or record ID value 506. Then, when one of these identified game play records 500 is assigned for a lottery game play request, the next available promotion record 502 from set 503 may be selected and also assigned to the lottery game play request. The assigned promotion record 502 may be selected at random from set 503, selected in order from set 503, or selected in any other suitable fashion.

The assignment of a game play record or promotion record by an assignment component according to the invention may involve a communication of information contained in the assigned game play record or promotion record to the player station at which the game play request was entered. The communicated information will at least be sufficient to allow the player station to identify the result associated with the game play record in the case a game play record is assigned so that the result may be presented to the player in some fashion. Where a promotion record is assigned, the communicated information will at least be sufficient to allow the player station to identify the promotion prize to be awarded. In some preferred forms of the invention, the assignment component such as component 301 in FIG. 3 communicates only a result index value such as the value in field 307 and a promotion prize ID such as the value in field 312. Of course, where the distribution group and promotion records are already stored at the player station, the communication associated with the assignment of a game play record may simply comprise reading the required game play record data by the processing device at the player station and the assignment of a promotion record may comprise reading the required promotion record data (such as field 312 in FIG. 3) by the player station processing device.

Preferred forms of the invention perform the required game play record and/or promotion record assignment processes under the control of assignment program code executed by a suitable processing device. For example, assignment component 301 in FIG. 3 may execute assignment program code according to the invention.

The manner in which promotion record results are used at a player station may vary widely within the scope of the invention. In some forms of the invention, the assignment of a promotion record for a lottery game play request may cause the player station from which the lottery game play request was initiated to produce a special graphic display indicating that a promotion prize has been won. The manner in which the promotion prize is awarded will depend primarily upon the nature of the promotion prize. For example, where an assigned promotion record is associated with a tangible promotion prize such as a T-shirt or event ticket, the player station will preferably issue a voucher or ticket that is encoded in some fashion with a definition for the promotion prize. The player may then take that voucher or ticket to a redemption station to redeem it for the tangible promotion prize. However, where the assigned promotion prize is gaming credit, for example, the prize may be credited to the player through the normal payout system employed at the player station for the lottery game.

Determination indicated at decision block 603 in FIG. 6 may be performed in any suitable fashion. The particular actions required in this promotion recall condition checking step will depend largely upon the nature of the promotion recall condition. In some preferred forms of the invention, a promotion using a given promotion record set may be run for only a fixed period of time. In this case, checking for the promotion recall condition may involve checking the time to determine if the fixed period of time has expired. In other forms of the invention, a promotion may be run for some variable period of time depending upon conditions or events at the gaming facility or elsewhere. Checking for the promotion recall condition in this case may be done manually or in some automated fashion. In an automated condition checking arrangement, a suitable component in the gaming system, such as the distribution component or assignment component may periodically check for the promotion recall condition under the control of promotion control program code. Otherwise the respective component may simply respond to an operator input that is manually entered in response to the promotion recall condition.

The step the generating the promotion recall command and communicating the command to the assignment component as indicated at process block 604 in FIG. 4 is preferably performed by a promotion control component included in the gaming system operating under the control of the promotion control program code. In the arrangement shown in FIG. 3, this promotion control component is incorporated with the distribution component in the form of distribution/promotion control component 315. The invention is not limited to any particular form for the promotion recall command or any manner of communicating the command to the assignment component. The promotion recall command may be any command or signal that may be recognized by the assignment component so that the assignment component can perform the promotion record recall procedure indicated at process block 605 in FIG. 6.

The promotion record recall procedure indicated at process block 605 may be performed in a number of different fashions within the scope of the invention. In one form of the invention, the promotion record recall procedure includes communicating the promotion records back to the distribution component from the assignment component. In the promotion record set arrangement shown in FIG. 5, this involves simply communicating the promotion record set 503 back to the distribution component. However, in forms of the invention such as those shown in FIGS. 3 and 4 where the promotion records are incorporated in some fashion into the distribution group, the promotion records may first be extracted from the distribution group in some suitable fashion.

Alternatively to communicating the promotion records back to the distribution group, the promotion record recall procedure indicated at process block 605 in FIG. 6 may include simply preventing additional promotion records from the affected promotion record set from being assigned in response to incoming lottery game play requests. For example, one preferred form of the invention changes a promotional status value such as promotional status value 313 in FIG. 3, 413 in FIG. 4, and 512 and FIG. 5 to an invalid status. This invalid status indicates that the promotion record is not available to be assigned by the assignment component. In the combined game play record and promotion record 303 shown in FIG. 3, the assignment component would detect the invalid status at value 313 and would simply ignore the promotion record portion of record 303. In the arrangement shown in FIG. 4, the assignment component could simply skip promotion records 401. In the promotion record arrangement shown in FIG. 5, the assignment component would not perform the process for assigning particular promotion records from the set 503.

The invention is not limited to arrangements in which a promotion status value associated with each promotion record is invalidated in accordance with a promotion record recall procedure. Some forms of the invention may include no promotion status value in the promotion records and rely on other components of the promotion records to identify those records as such and ensure that the records are not assigned after a respective promotion recall command for a given promotion record set.

It should be noted that more than one promotion record set may be in use at a given assignment component such as component 301 in FIG. 3 at any given time. That is, the flexibility of the present invention allows multiple promotions to run concurrently. Where multiple promotions are running concurrently and thus multiple promotion record sets are stored at assignment components in the lottery gaming system, the promotion recall condition and promotion recall command may be specific to a given one of the promotion record sets. Thus, one promotion record set may be recalled, leaving other promotion record sets actively in use at one or more assignment components in the gaming system.

As used herein, whether in the above description or the following claims, the terms "comprising", "including", "carrying", "having", "containing", "involving", and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above described preferred embodiments are intended to illustrate the principles of the invention, but not to limit the scope of the invention. Various other embodiments and modifications to these preferred embodiments may be made by those skilled in the art without departing from the scope of the invention.

The invention claimed is:

1. A method including:
   (a) communicating a distribution group of lottery game play records each including a record identifier and prize value identifier in credits to an electronic assignment component included in a gaming system, and storing the distribution group so as to be accessible to the assignment component;

(b) communicating one or more promotion records to the assignment component, the promotion records created independently of the lottery game play records, at least one of the one or more promotion records including a promotion prize identifier from which is determined a promotion prize to be awarded in response to assignment of the at least one promotion record, and storing the one or more promotion records so as to be accessible to the assignment component, each promotion prize being distinct from possible prizes in the distribution group of lottery game play records;

(c) receiving a lottery game play request from an electronic player machine in the gaming system;

(d) in response to the lottery game play request, assigning a respective one of the one or more promotion records to the player machine for the lottery game play request;

(e) causing a result to be displayed including graphics consistent with the promotion record that has been assigned; and (f) recalling at least a first set of promotion records out of the one or more promotion records remaining unassigned from the assignment component, the recalling being performed in response to a promotion recall command from a distribution/promotion control component, the recalling leaving at least one other set of promotion records actively in use in the lottery game.

2. The method of claim 1 wherein communicating one or more promotion records to the assignment component is performed separately from communicating the distribution group to the assignment component.

3. The method of claim 1 wherein at least one of the promotion prize identifiers identifies a non-credit, non-monetary prize to be awarded.

4. The method of claim 3 further including incorporating the one or more promotion records into the distribution group prior to communicating the distribution group to the assignment component.

5. The method of claim 1 further including associating each promotion record with a respective lottery game play record in the distribution group, and wherein assigning the respective one of the one or more promotion records for the lottery game play request includes assigning the respective lottery game play record with which the respective promotion record is associated.

6. The method of claim 1 wherein storing the one or more promotion records so as to be accessible to the assignment component includes storing the one or more promotion records separately from the distribution group.

7. The method of claim 1 further including inserting each promotion record into the distribution group between two respective lottery game play records.

8. The method of claim 1, in which recalling the first set of promotion records further includes invalidating the first set of promotion records by changing a promotional status value in each of the first set of promotion records to a value indicating invalidity, the invalidating being performed in response to the promotion recall command.

9. A gaming system for providing a lottery game, the system including:

(a) a data storage device storing a distribution group of lottery game play records each including a record identifier and a prize value identifier in credits and one or more promotion records;

(b) an assignment component on a gaming server having access to the data storage device, the assignment component for receiving a lottery game play request from an electronic player station and assigning a respective one of the one or more promotion records for the lottery game play request, the promotion records created independently of the lottery game play records, the respective one promotion record including a promotion prize identifier for identifying a promotion prize to be awarded in response to assignment of the respective one promotion record, each promotion prize being distinct from prizes in the distribution group of lottery game play records; and (c) a promotion control component for communicating the promotion records to the assignment component, and for producing a promotion recall command and communicating the promotion recall command to the assignment component, the promotion recall command operative to cause the assignment component to recall a first set of promotion records out of the one or more promotion records remaining unassigned from the assignment component, the recalling leaving at least one other set of promotion records actively in use in the lottery game.

10. The gaming system of claim 9 further including a distribution component for communicating the distribution group of lottery game play records to the data storage device.

11. The gaming system of claim 10 wherein the distribution component is also for communicating the one or more promotion records to the data storage device.

12. The gaming system of claim 11 wherein the at least one of the promotion prize identifiers identifies a non-credit, non-monetary prize to be awarded.

13. The gaming system of claim 11 wherein the distribution component communicates the distribution group to the data storage device as a separate operation from communicating the one or more promotion records to the data storage device.

14. The gaming system of claim 9 wherein the assignment component responds to the promotion recall command by causing the first set of promotion records to be communicated back to the distribution component.

15. The gaming system of claim 9 wherein the assignment component responds to the promotion recall command by causing the first set of promotion records to be invalidated.

16. The gaming system of claim 9 wherein the assignment component is also for assigning a respective lottery game play record from the distribution group for the lottery game play request.

17. The gaming system of claim 9 wherein the respective one of the one or more promotion records is associated with a respective one of the lottery game play records in the distribution group and wherein the assignment of the respective one of the one or more promotion records effectively assigns the respective lottery game play record with which the respective promotion record is associated.

18. A program product stored on one or more computer readable devices, the program product including:

(a) record store program code executable for causing a distribution group of lottery game play records each including a record identifier and a prize value identifier in credits and one or more promotion records to be stored at a data storage system from which lottery game play records are assigned in a lottery gaming system, at least one of the one or more promotion record including a promotion prize identifier from which is determined a promotion prize to be awarded in response to assignment of the promotion record, each promotion prize being distinct from prizes in the distribution group of lottery game play records; and (b) assignment program code executable for assigning a respective one of the one or more promotion records for a lottery game play request received from an electronic player station in a lottery gaming system, the promotion records created independently of the lottery game play records, the respective promotion record being distinct from a result in a lottery game conducted through the lottery gaming system.

(c) game display program code operable to cause a result to be displayed including graphics consistent with the promotion record that has been assigned; and (d) distribution/promotion control program code executable for communicating the promotion records to be available to the assignment program code, and for producing a recall command for a first set of the one or more promotion records remaining unassigned, and leaving at least one other set of promotion records actively in use in the lottery game.

19. The program product of claim 18 in which the distribution/promotion control program code is further executable for communicating the distribution group and the one or more promotion records to a data processing system associated with the data storage system.

20. The program product of claim 19 wherein at least one of the promotion prize identifiers identifies a non-credit, non-monetary prize to be awarded.

21. The program product of claim 19 wherein the distribution/promotion control program code is executable for communicating the distribution group to the data processing system associated with the data storage system separately from communicating the one or more promotion records to the data processing system associated with the data storage system.

22. The program product of claim 18 wherein the record store program code is also executable for responding to the recall command by causing at least the recalled promotional records that remain unassigned at the time of the recall command to be removed from the data storage system.

23. The program product of claim 18 wherein the record store program code is also executable for responding to the recall command by causing each recalled promotion record that remains at the time of the recall command unassigned to be invalidated so that each respective promotion record that remains unassigned is unassignable for a respective lottery game play request.

24. The program product of claim 18 wherein the assignment program code is also executable for responding to the recall command by disabling each recalled promotion records that remains unassigned at the time of the recall command from being assigned for the respective lottery game play request.

25. The gaming system of claim 9 wherein the assignment component is also for assigning a respective non-credit promotional prize in lieu of a respective lottery game play record from the distribution group for the lottery game play request.

26. The method of claim 1, further including receiving the promotional records from a third party producer.

27. The method of claim 1, further including advertising a first period of time in which promotion prizes are available in a game, and producing the promotion recall command at the end of the first period of time.

28. The gaming system of claim 9, further including the electronic player station, and in which the electronic player station is operable to produce the lottery game play request, and in response to receiving the respective promotion record responsive to the first lottery game play request, to display graphics to a player indicating the promotion prize of the promotion record.

* * * * *